United States Patent [19]

Morio et al.

[11] Patent Number: 4,542,419
[45] Date of Patent: Sep. 17, 1985

[54] METHOD AND APPARATUS FOR RECORDING AND REPRODUCING AN INFORMATION SIGNAL COMPRISING A VIDEO SIGNAL AND AUDIO SIGNAL

[75] Inventors: Minoru Morio, Tokyo; Kenji Nakano; Hisayoshi Moriwaki, both of Kanagawa, all of Japan

[73] Assignee: Sony Corporation, Tokyo, Japan

[21] Appl. No.: 463,337

[22] Filed: Feb. 2, 1983

[30] Foreign Application Priority Data

Feb. 2, 1982 [JP] Japan .................................. 57-15287

[51] Int. Cl.⁴ .............................................. H04N 5/91
[52] U.S. Cl. ..................................... 360/19.1; 360/32; 360/64; 358/343
[58] Field of Search ..................... 360/32, 19.1, 64, 61, 360/8; 358/343

[56] References Cited

U.S. PATENT DOCUMENTS

| 4,303,950 | 12/1981 | Morio | 360/19.1 |
| 4,390,906 | 6/1983 | Furumoto | 360/19.1 |
| 4,446,490 | 5/1984 | Hoshimi | 360/32 |

*Primary Examiner*—Alan Faber
*Attorney, Agent, or Firm*—Lewis H. Eslinger; Alvin Sinderbrand

[57] ABSTRACT

Apparatus for recording and reproducing an information signal comprising at least an analog audio signal in a plurality of successive tracks on a magnetic tape includes a PCM processing circuit for converting an analog audio signal into a PCM audio signal; a video signal processing circuit for processing a video signal to produce an output video signal; a rotary magnetic head assembly for recording the output video signal and the PCM audio signal in the plurality of successive tracks on the tape; a switch assembly for supplying the output video signal and the PCM audio signal to the rotary magnetic head assembly; and a control circuit for controlling the switch assembly to supply the output video signal and the PCM audio signal to the rotary magnetic head assembly during a video use mode so that the latter records the output video signal in a main section of each track and to supply only the PCM audio signal to the rotary magnetic head assembly during an audio use mode so that the latter records the PCM audio signal in different segments of the main section and overscan section of each track.

18 Claims, 24 Drawing Figures

METHOD AND APPARATUS FOR RECORDING AND REPRODUCING AN INFORMATION SIGNAL COMPRISING A VIDEO SIGNAL AND AUDIO SIGNAL

BACKGROUND OF THE INVENTION

This invention relates generally to a method and apparatus for recording and reproducing an information signal and, more particularly, is directed to a method and apparatus for recording and reproducing a color television signal comprising a video signal and an audio signal on a magnetic tape with a plurality of rotary magnetic heads.

Information signal recording and reproducing apparatus for recording and reproducing a video signal on a magnetic tape by means of a rotary magnetic head assembly are well known in the art. For example, in a helical scan video tape recorder (VTR), at least one rotary magnetic head is rotated at a predetermined angle with respect to the longitudinal or tape running direction of a magnetic tape as the latter is advanced so as to form successive video tracks extending obliquely on the magnetic tape. With the helical scan video tape recorder, it is possible to achieve high density recording of the video signal by advancing the magnetic tape at a slow running speed and, at the same time, providing a high relative speed between the magnetic head assembly and magnetic tape. However, with known helical scan video tape recorders in which an audio signal is recorded and reproduced on an audio track extending in the longitudinal or tape running direction of the magnetic tape by a stationary magnetic head, there results a deterioration of the signal-to-noise (S/N) ratio and an increase in the wow and flutter when the speed of advancement of the magnetic tape is reduced. This, of course, results in a deterioration in the quality of the reproduced audio signal, causing the audio signal to have unsatisfactory quality when reproduced.

In order to overcome the aforementioned problem in the recording and reproducing of an audio signal by a stationary magnetic head, it has been proposed to effect the recording and reproducing of the audio signal by means of a rotary magnetic head. With this proposal, an overscan section is provided for each oblique track, for example, by increasing the tape winding angle about the guide drum assembly of the helical scan video tape recorder. In this manner, each record track obliquely formed on the magnetic tape by the rotary magnetic head assembly includes a video track section and an audio track section, the latter of which corresponds to the aforementioned overscan section. The audio signal that is recorded and reproduced with respect to the audio track section of each track is processed as high density data obtained by processing the signal with a time axis or base compression and a time axis or base expansion.

In one known apparatus, two rotary magnetic heads are provided and are spaced apart by 180°. Thus, each head scans alternate ones of the successive tracks extending obliquely on the magnetic tape. It has been proposed to digitize and compress the audio signal and recorded the same in the overscan section at the beginning of each track with such known apparatus. Such arrangement provides the desirable feature of recording the video signal and the high quality digitized audio signal in separate sections of each track. In some cases, it may also be desirable to record only the digitized audio signal in the entire portion of each track, that is, in the video track section and audio track section, without reproducing any video signal therein. With this latter arrangement, since the audio signal is recorded as a digitized audio signal, high quality audio reproduction can be achieved. However, because the audio signal is recorded in digital form, error correction codes, run-in or preamble signals and the like are added to the digitized audio signal. Further, because the digitized audio signal is compressed, the digitized audio signal is an intermittent signal, that is, with time gaps between compressed portions of the digitized audio signal. As a result, timing of the audio signal to be recorded in the entire portion of each record track makes it difficult to utilize the same circuitry as that used for processing a digitized audio signal which is recorded in only the overscan section of each track and combined with a video signal recorded in the main section of each track, thereby requiring the use of separate audio processing circuitry. This duplication of circuitry, of course, becomes wasteful and relatively expensive. It is to be further appreciated that, if an audio signal is successively recorded in the entire portion of each track, it becomes relatively time consuming and bothersome to search for a particular audio selection.

OBJECTS AND SUMMARY OF THE INVENTION

Accordingly, it is an object of this invention to provide a method and apparatus for recording and reproducing an information signal that avoids the above-described difficulties encountered with previously known apparatus.

More particularly, it is an object of this invention to provide a method and apparatus for recording and reproducing an information signal that provides the same audio processing circuitry for processing a digitized audio signal, regardless of whether the audio signal is recorded alone in the entire portion of each track or only in an overscan section of each track along with a video signal in the remainder of each track.

It is another object of this invention to provide a method and apparatus for recording and reproducing an information signal that provides for more ready searching of a desired selection when an audio signal is recorded alone in the entire portion of each track.

In accordance with an aspect of this invention, apparatus for recording an information signal comprising at least an audio signal in a plaurality of successive tracks on a record medium, includes audio signal processing means for converting the audio signal into digital form; video signal processing means for processing a video signal of the information signal to produce an output video signal; transducer means for recording the output video signal and the digitized audio signal in the plurality of record tracks on the record medium; switch means for supplying the output video signal and the digitized audio signal to the transducer means; and control means for controlling the switch means to supply the output video signal and the digitized audio signal to the transducer means during a video use mode so that the latter records the output video signal in a main section of each track and the digitized audio signal in an overscan section of each track and to supply only the digitized audio signal to the transducer means during an audio use mode so that the latter records the digitized audio signal in at least one of the main section and overscan section of each track.

In accordance with another aspect of this invention, apparatus for reproducing an information signal comprising at least a digitized audio signal recorded in a plurality of successive tracks on a record medium, with the digitized audio signal being recorded in at least an overscan section of each track, includes transducer means for scanning the tracks to reproduce the information signal recorded in the plurality of successive tracks; audio signal processing means for converting the digitized audio signal to an analog audio signal; video signal processing means for processing a video signal of the information signal to produce an output video signal; switch means for supplying the information signal reproduced during scanning of the overscan section of each track to the audio signal processing means and for supplying the information signal reproduced during scanning of a main section of each track to one of the audio signal processing means and the video signal processing means; and control means for controlling the switch means to supply the information signal reproduced during scanning of the main section of each track to the audio signal processing means during an audio use mode and to supply the information signal reproduced during scanning of the main section of each track to the video signal processing means during a video use mode.

The above, and other, objects, features and advantages of the present invention will become readily apparent from the following detailed description thereof which is to be read in connection with the accompanying drawings.

DETAILED DESCRIPTION OF A PREFERRED EMBODIMENT

Figure 1:
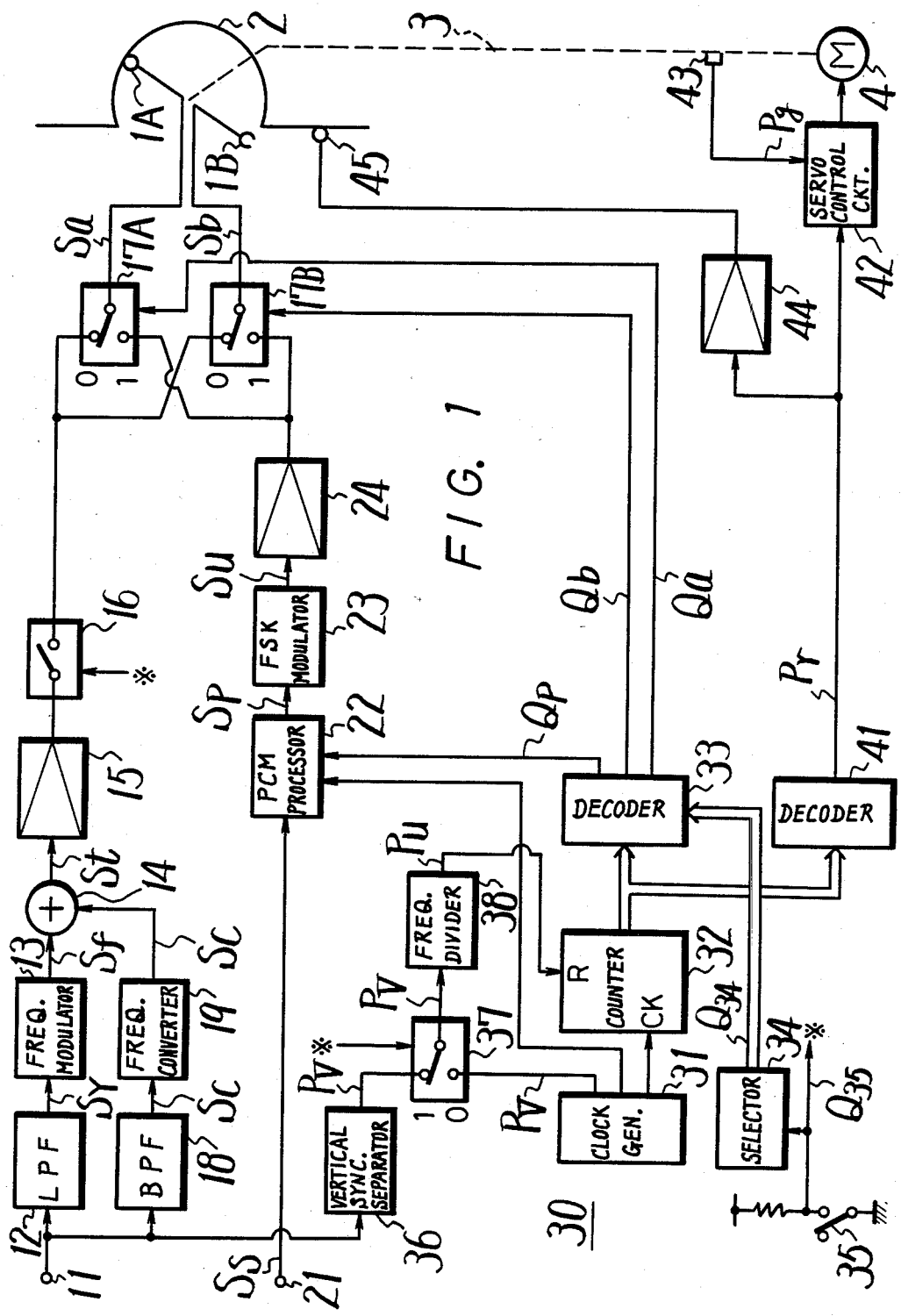
FIG. 1 is a block diagram of apparatus for recording an information signal according to one embodiment of the present invention.
Figure 3:
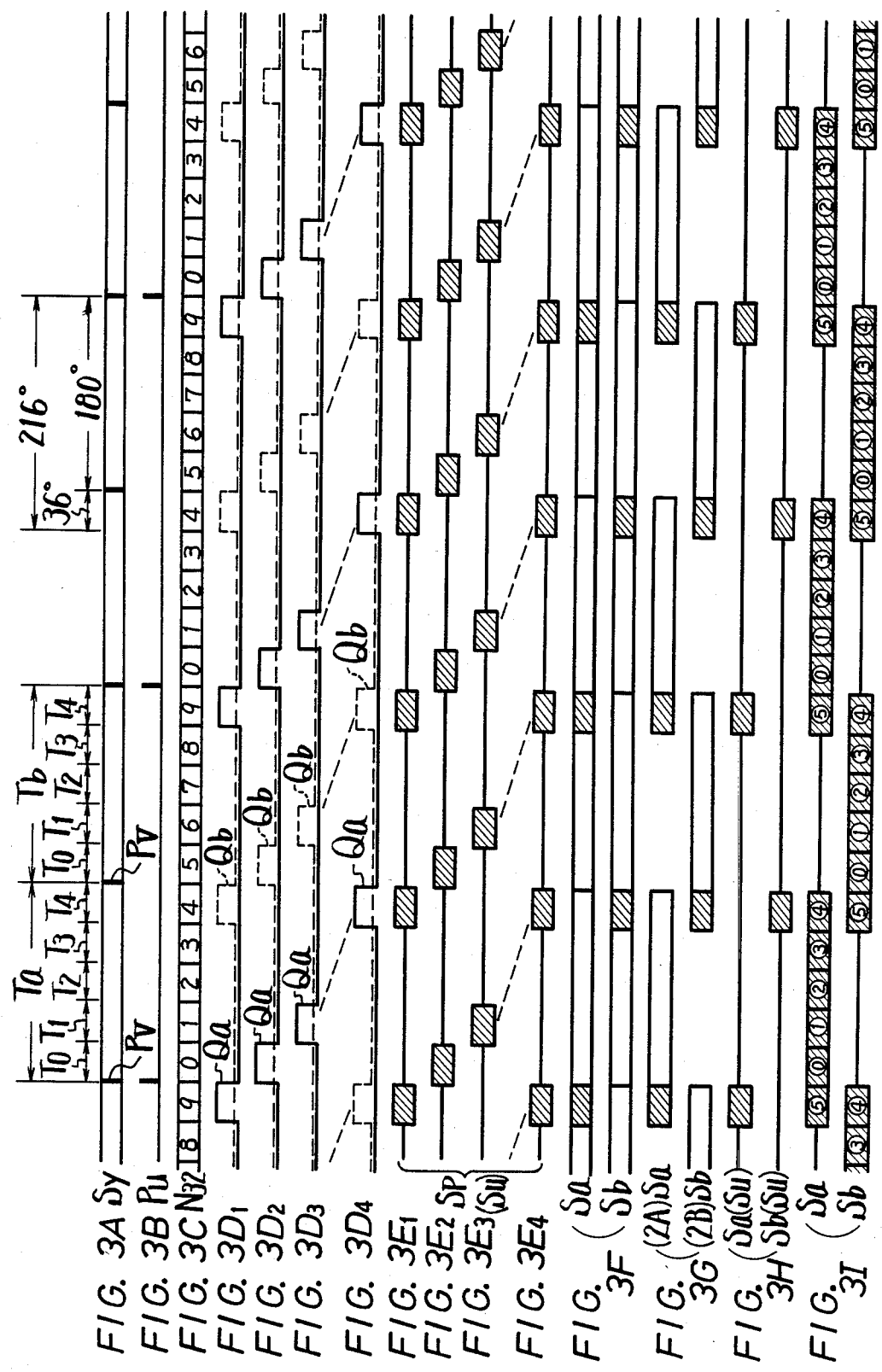
FIGS. 3A–3I are waveform diagrams used for explaining the operation of the apparatus of FIGS. 1 and 2.
Figure 4:
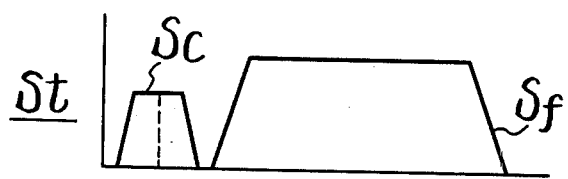
FIG. 4 is a frequency diagram illustrating the frequency spectrum of a video signal processed in accordance with the present invention.

Referring to the drawings in detail, and initially to FIG. 1 thereof, a recording section of a helical scan video tape recorder (VTR) according to one embodiment of the present invention includes a low pass filter (LPF) 12 supplied with a color video signal from an input terminal 11. The luminance component $S_y$, shown in FIG. 3A, is separated from the input color video signal by LPF 12 and supplied to a frequency-modulation circuit 13 which, in turn, frequency modulates the luminance component $S_y$ to produce a frequency-modulated luminance signal $S_f$ and supplies the frequency-modulated luminance signal $S_f$ to one input of an adder 14. The color video signal from input terminal 11 is also supplied to a band pass filter (BPF) 18 which separates the chrominance component $S_c$ therefrom. The chrominance component $S_c$ is then frequency converted to a lower frequency band by a frequency converter 19 which supplies a frequency-converted chrominance signal $S_c$ to another input of adder 14, the latter adder 14 functioning to combine the frequency-modulated luminance signal $S_f$ and the frequency-converted chrominance signal $S_c$ to produce a combined video signal $S_t$. It is to be noted that the carrier of the chrominance signal $S_c$ preferably has its frequency and phase changed so as to be in an interleaving relation for successive field intervals. Further, it is to be appreciated that signals $S_f$ and $S_c$ occupy distinct frequency bands and therefore do not interfere with one another, as shown in FIG. 4. Combined video signal $S_t$ is then supplied through a recording amplifier 15 and switches 16, 17A and 17B, as will be discussed in greater detail hereinafter, to rotary magnetic heads 1A and 1B to be recorded in successive parallel tracks on a magnetic tape 2. As will be appreciated from the discussion hereinafter, switch circuit 16 is turned ON to supply the video signal $S_t$ to switches 17A and 17B during a video use mode, in response to a selection signal $Q_{35}$ from a selecting switch 35. Hereinafter, reference to a video use mode will mean the recording of a digitized audio signal in the overscan section of each track and the recording of a video signal in the main section of each track, while reference to an audio use mode will mean the recording of a digitized audio signal both in the overscan section and main section of each track.

In addition, the VTR of FIG. 1 is designed to also record a pulse code modulated (PCM) audio signal in at least an audio track section or overscan section of each track during the first 36° rotation of magnetic heads 1A and 1B with respect to each record track. More particularly, an analog audio signal $S_s$ from an input terminal 21 is supplied to a PCM processing circuit 22 which includes an analog-to-digital (A/D) converting circuit which converts the analog audio signal $S_s$ to a digital signal, a PCM encoding circuit which encodes the digitized audio signal and adds error correcting codes and a run-in (preamble) signal thereto to produce an encoded PCM audio signal and a compression circuit which compresses the encoded PCM audio signal to produce a compressed PCM audio signal $D_p$ at the output of PCM processing circuit 22. It is to be appreciated that audio signal $S_p$ is intermittent, as shown in FIG. 3E, as a result of the aforementioned compression. The latter output signal from PCM processing circuit 22 is then supplied to a frequency shift key (FSK) modulation circuit 23 which frequency modulates the PCM audio signal $S_p$ from PCM processing circuit 22. FSK modulation circuit 23 may include first and second oscillators which generate oscillation signals having frequencies $f_1$ and $f_2$, respectively, and a switching circuit coupled to PCM processing circuit 22 for selecting the oscillation signal generated by one of the oscillators in response to the PCM audio signal $S_p$ supplied thereto. For example, the switching circuit may be responsive to each logic level "0" portion of the PCM audio signal to select the first oscillation signal having a frequency $f_1$, and responsive to each logic level "1" portion of the PCM audio signal to select the oscillation signal having a frequency $f_2$. As a result, FSK modulation circuit 23 may be thought of as modulating logic level "0" portions of the PCM audio signal $S_p$ with the oscillation signal having a frequency $f_1$ and modulating logic level "1" portions of the PCM audio signal $S_p$ with the oscillation signal having a frequency $f_2$.

Figure 5:
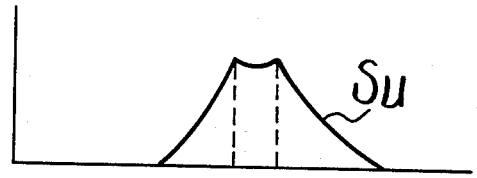
FIG. 5 is a frequency diagram illustrating the frequency spectrum of a PCM audio signal processed in accordance with the present invention.
Figure 7:
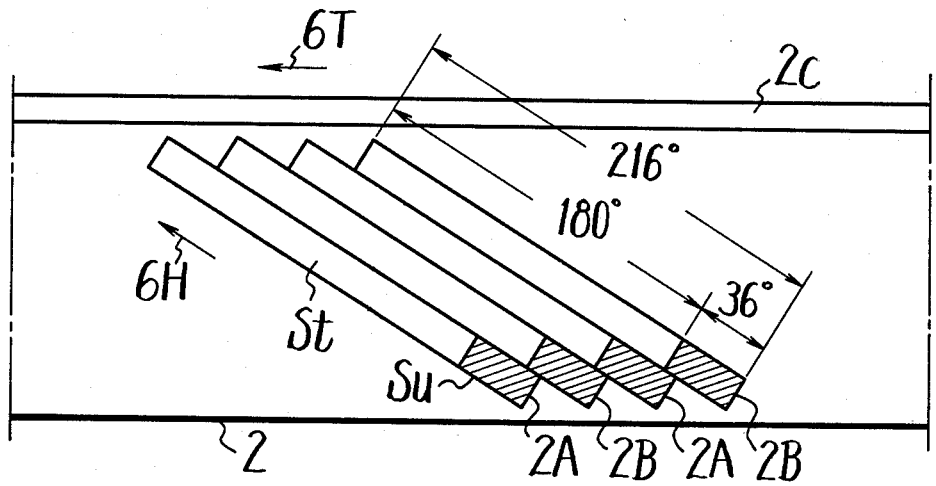
FIG. 7 is a schematic plan view of a section of magnetic tape showing the arrangement in which the video and audio signals are recorded with the recording section of FIG. 1 during a video use mode.

The output PCM audio signal $S_u$ from FSK modulation circuit 23, the frequency spectrum of which is shown in FIG. 5, is supplied through a recording amplifier 24 to input contacts "1" of change-over switch circuits 17A and 17B, respectively, while the combined video signal $S_t$ is supplied to input contacts "0" of switch circuits 17A and 17B, respectively. Each of switch circuits 17A and 17B includes a movable arm which switches either PCM audio signal $S_u$ from recording amplifier 24 or the combined video signal $S_t$ from recording amplifier 15 to rotary magnetic heads 1A and 1B, in accordance with the timing chart shown in FIG. 3G during the video use mode. In this manner, during the video use mode, the combined video signal $S_t$ is recorded in the trailing main section of each record track 2A and 2B corresponding to the last 180° rotation of the magnetic heads with respect to the record tracks, while the PCM audio signal $S_u$ is recorded in the overscan section of each track at the leading edge thereof corresponding to the first 36° rotation of the magnetic heads with respect to the record tracks, as shown in FIG. 7.

More particularly, change-over switch circuits 17A and 17B are responsive to switch control signals $Q_a$ and $Q_b$, respectively, shown in FIG. 3D$_1$, supplied thereto from a decoder 33, to couple the input contacts "0" or "1" thereof to the respective magnetic heads 1A and 1B. When switch control signal $Q_a$ is at a high or logic "1" level and switch control signal $Q_b$ is at a low or logic "0" level, the movable arms of switch circuits 17A and 17B are controlled to connect contacts "1" and "0", respectively, to the outputs thereof. More particularly, at such time, when the respective heads are in contact with the tape, combined video signal $S_t$ from recording amplifier 15 is supplied to magnetic head 1B to be recorded in the main section of a record track 2B during the last 180° rotation of magnetic head 1B with respect to that track, and PCM audio signal $S_u$ is supplied by recording amplifier 24 to magnetic head 1A to be recorded in the overscan section at the leading portion of the next adjacent track 2A, as shown in FIG. 7. When switch control signal $Q_a$ is at a low or logic "0" level and switch control signal $Q_b$ is at a high or logic "1" level, the reverse condition occurs, namely, PCM audio signal $S_u$ is supplied through switch circuit 17B to magnetic head 1B, while combined video signal $S_t$ is supplied through switch circuit 17A to magnetic head 1A following the PCM audio signal $S_u$ that had been recorded during the previous field interval in the same track.

Figure 6:
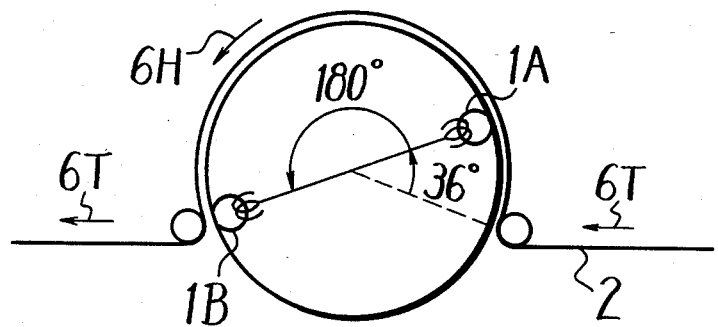
FIG. 6 is a schematic plan view of a rotary magnetic head assembly for a helical scan video tape recorder that can be used with the present invention.

As shown in FIG. 6, rotary magnetic heads 1A and 1B are arranged to subtend an angle of 180°, that is, the two rotary magnetic heads 1A and 1B are arranged in diametrically opposing relation to each other. The rotary magnetic head assembly includes a rotary guide drum which is rotated, along with heads 1A and 1B secured thereto, in the direction of arrow 6H, and magnetic tape 2 is helically wound about the outer periphery of the rotary guide drum so as to subtend an angle of approximately 216°. Magnetic tape 2 is advanced at a constant speed in the direction of arrow 6T by a tape drive system (not shown) comprising a capstan and pinch roller and is guided about the guide drum by guide rollers or pins. During the recording operation, rotary magnetic heads 1A and 1B alternately trace tracks 2A and 2B, as shown, for example, in FIG. 7. In this manner, each record track 2A is used for recording video and audio signals in odd field intervals, while the remaining alternate record tracks 2B are used for recording video and audio signals in even field intervals. In addition, magnetic heads 1A and 1B are provided with different azimuth angles so that the signals are recorded in adjacent tracks with different azimuth angles.

It is to be appreciated that since the angle between rotary magnetic heads 1A and 1B is less than the angle subtended by the tape wound about the outer periphery of the rotary guide drum, rotary magnetic heads 1A and 1B are simultaneously in contact with magnetic tape 2 during an overscan or overlap period. Thus, as previously discussed with respect to FIG. 7, with the recording section of FIG. 1, in the video use mode, during the first 36° rotation of rotary magnetic heads 1A and 1B, PCM audio signal $S_u$ is recorded in record tracks 2A and 2B, respectively. During the next 180° rotation of the heads, combined video signal $S_t$ is recorded in the main section of tracks 2A and 2B, respectively, with each track containing information corresponding to one field interval of the video signal. In addition, a servo control track 2C provided at the upper edge of magnetic tape 2 has recorded therein a control pulse signal $P_r$ is synchronism with the vertical synchronizing signal $P_v$ of the video signal.

The recording section of the helical scan video tape recorder of FIG. 1 according to this invention also includes a control circuit 30 for selectively controlling the apparatus to record the video signal $S_t$ in the main section of each track and the PCM audio signal $S_u$ in the overscan section of each track during the video use mode and for recording only the PCM audio signal $S_u$ in both the overscan section and main section of each track during the audio use mode. More particularly, selecting switch 35 includes an arm movable between an open and closed position, thereby providing selection signal $Q_{35}$ which is at a logic "1" level during the video use mode and is at a logic "0" level during the audio use mode. For example, when switch 35 is closed, the output therefrom is connected to ground so that selecting signal $Q_{35}$ is at a logic "0" level. On the other hand, when switch 35 is open, the output of switch 35 is connected to a high potential so that selecting signal $Q_{35}$ is at a high or logic "1" level. Thus, during the video use mode, selection signal $Q_{35}$ which is at a logic "1" level is supplied to switch 16 for turning the latter ON so that video signal $S_t$ can be supplied through switch circuits 17A and 17B to magnetic heads 1A and 1B, respectively.

Control circuit 30 includes a vertical synchronizing signal separating circuit 36 which separates the vertical synchronizing signal $P_v$ (FIG. 3A) from the color video signal. The vertical synchronizing signal $P_v$ is supplied to a fixed contact "1" of a switch 37, the latter having a movable arm controlled by selection signal $Q_{35}$ to connect either its input contact "1" or another input contact "0" to the output thereof. During the video use mode, when selection signal $Q_{35}$ is at a logic "1" level, the movable arm of switch 37 is connected to input contact "1" so that vertical synchronizing signal $P_v$ from vertical synchronizing signal separating circuit 36 is supplied through switch 37 to a frequency divider 38 which produces a pulse signal $P_u$ synchronized with vertical synchronizing signal $P_v$ and which occurs at the beginning of each odd-numbered field interval $T_a$, as shown in FIG. 3B. Pulse signal $P_u$ is then supplied to a reset input terminal of counter 32 which is supplied at its clock input terminal CK with clock pulses generated by a clock generator 31. As an example which will be used hereinafter, the frequency of the clock pulses from clock generator 31 is five times as high as that of the field frequency, that is, the vertical synchronizing signal $P_v$, and the count value $N_{32}$ of counter 32 is successively incremented by one, starting from "0", at the beginning of each odd-numbered field interval $T_a$. In this regard, the count value $N_{32}$ increments from a value "0" to a value "4" during time periods $T_0$–$T_4$ in each odd numbered field interval $T_a$, and increments from a value "5" to a value "9" during time periods $T_0$–$T_4$ in each even-numbered field interval $T_b$. The count value $N_{32}$ from counter 32 is supplied to decoder 33. Clock generator 31 also supplies clock pulses to PCM processing circuit 22 for controlling various timing functions therein.

In addition, selection signal $Q_{35}$ from switch 35 is supplied to a selecting circuit 34 as an inhibit signal whereby, during the video use mode when selection signal $Q_{35}$ is at a logic "1" level, selecting circuit 34, in response to selection signal $Q_{35}$, control decoder 33 to select desired values of count value $N_{32}$. More particularly, during the video use mode, selecting circuit 34 produces a signal $Q_{34}$ which designates the count values "9" and "4". Thus, in response thereto, decoder 33 produces the aforementioned switch control signals $Q_a$ and $Q_b$ which respectively are at a logic "1" level when the count value $N_{32}$ is equal to "9" and "4", as shown in FIG. 3D$_1$. In this manner, switch control signals $Q_a$ and $Q_b$ control the switching of switches 17A and 17B to supply video signal $S_t$ and compressed PCM audio signal $S_u$ to magnetic heads 1A and 1B so as to record the latter signals in the form shown in FIG. 7, as previously described. Further, decoder 33 generates an OR control signal $Q_p$ in response to switch control signals $Q_a$ and $Q_b$ such that control signal $Q_p$ is at a logic "1" level during each period $T_4$ corresponding to the count values of "9" and "4" and which is supplied to PCM processing circuit 22 for enabling the latter and thereby designating the timing of PCM signals $S_p$ generated therefrom so that PCM audio signal $S_u$ is recorded in the overscan section of each track, as shown in FIG. 3E$_1$, and corresponding to time period $T_4$ in each field interval $T_a$ and $T_b$.

In addition, the count value $N_{32}$ of counter 32 is supplied to a decoder 41 which produces control pulse signal $P_r$ which is at a logic "1" level at times when the count value $N_{32}$ is equal to zero, that is, at the beginning of each odd-numbered field interval $T_a$. Control pulse signal $P_r$ is supplied to a recording amplifier 44 which, in turn, supplies the aforementioned control pulse signal, which is in synchronism with the vertical synchronizing signal $P_v$, to a magnetic head 45 positioned at the upper edge of magnetic tape 2 for recording the control pulse signal in servo control track 2C. In order to control the rotary speed and phase of the rotary magnetic heads, a pulse generator 43 associated with a rotary shaft 3 about which rotary magnetic heads 1A and 1B are rotated, produces a pulse $P_g$ for each revolution of rotary magnetic heads 1A and 1B. In response to pulses $P_g$ and control pulse signal $P_r$ supplied thereto, a servo control circuit 42 supplies an output signal to a motor 4 which controls the rotary speed and phase of magnetic heads 1A and 1B such that rotation of magnetic heads 1A and 1B occurs in synchronism with vertical synchronizing signal $P_v$ and such that there is a rotational delay of 36° from the beginning of each track before each head 1A and 1B begins recording combined video signal $S_t$ in the respective record track, as shown in FIG. 7. In other words, as shown in FIG. 7, each track 2A and 2B corresponds to a rotation of 216° for each respective head 1A and 1B whereby, when one head is located at an angle of 36° from the entrance of a track, the other head is located at the exit of the previous track. During the first 36° rotation for each track, PCM audio signal $S_u$ is recorded in the respective tracks. During the following 180° rotation, combined video signal $S_t$ is supplied through recording amplifier 15 to the respective head 1A or 1B.

During the audio use mode, selection signal $Q_{35}$ from selecting switch 35 is at a logic "0" level. As a result, switch 16 is maintained in an open or OFF position so that combined video signal $S_t$ is not supplied to switch circuits 17A and 17B. It is to be appreciated that, at such time, no video signal is present so that vertical synchronizing signal separating circuit 36 does not supply the aforementioned vertical synchronizing signal $P_v$ to the "1" contact of switch 37. In such case, clock generator 31 produces a substitute or quasi-vertical synchronizing signal $P_v$ having a frequency substantially identical to a vertical synchronizing signal $P_v$ that would be produced by vertical synchronizing signal separating circuit 36. The substitute vertical synchronizing signal $P_v$ is supplied to the "0" contact of switch 37 and the movable arm of the latter is controlled by selection signal $Q_{35}$ to connect the "0" contact to the output thereof and thereby supply substitute vertical synchronizing signal $P_v$ to frequency divider 38.

During the audio use mode, the user controls selecting circuit 34 to record the audio signal in a desired segment ⑤, ⓪, ①, ②, ③ or ④ in the plurality of tracks (FIGS. 3I, 8A, 8B and 8C). It is to be appreciated that this selection of the segment of each track on which the audio signal is to be recorded is made possible by selection signal $Q_{35}$ which is at a logic "0" level during the audio use mode. In contradistinction thereto, during the video use mode, selecting circuit 34 is controlled by selection signal $Q_{35}$ which is at a logic "1" level to select only segment ⑤, that is, the overscan section of each track for recording the PCM audio signal $S_u$. During the audio use mode, if a user actuates selecting circuit 34 to produce signal $Q_{34}$ which designates count values $N_{32}$ of "9" and "4" decoder 33 produces switch control signals $Q_a$ and $Q_b$ having the phase relation shown in FIG. 3D$_1$. It is to be remembered that, control signal $Q_p$ is produced by an OR operation of switch control signals $Q_a$ and $Q_b$, whereby PCM processing circuit 22 produces PCM audio signal $S_p$ during each time period $T_0$ of both odd-numbered and even-numbered field intervals $T_a$ and $T_b$, as shown in FIG. 3E$_1$. PCM audio signal $S_p$ generated at such time by PCM processing circuit 22 is supplied to FSK modulation circuit 23 which produces PCM audio signal $S_u$ and supplies the same through recording amplifier 24 to switch circuits 17A and 17B. The latter switch circuits are controlled to connect the movable arms thereof to input contacts "1" only when switch control signals $Q_a$ and $Q_b$ are at logic "1" levels, as shown in FIG. 3D$_1$. In this manner, PCM audio signal $S_u$ is supplied to magnetic heads 1A and 1B only during time periods $T_4$ of field intervals $T_a$ and $T_b$ so that PCM audio signal $S_u$ is recorded in segment ⑤ of each successive parallel track, that is, during the first 36° rotation of each head with respect to the tracks and corresponding to the aforementioned overscan section of each track. It is to be appreciated that, at such time, no signals are recorded in the main section of each track during the remaining 180° rotation of the heads with respect to the tracks. Thus, when selecting circuit 34 is switched to select count values $N_{32}$ of "9" and "4", the PCM audio signal $S_u$ is recorded in the same manner as in the video use mode.

Figure 8A:
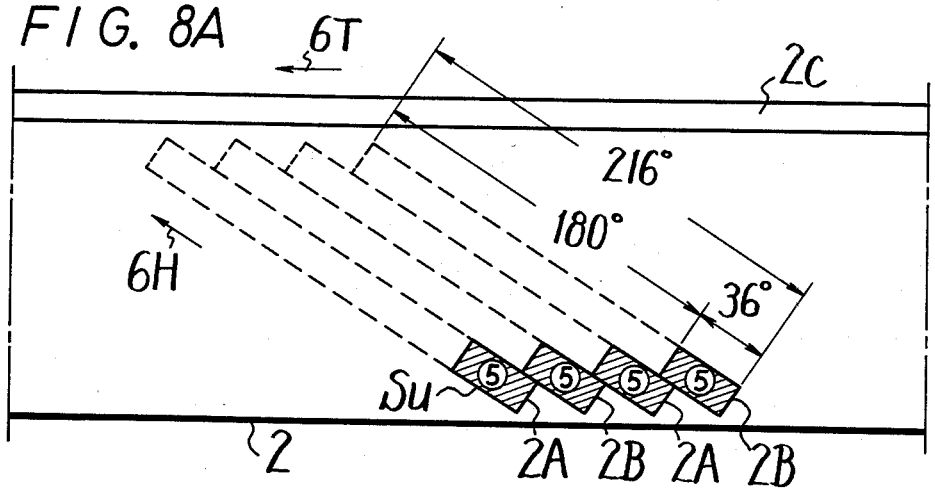
FIGS. 8A–8C are schematic plan views of sections of magnetic tape showing the recording of an audio signal with the recording section of FIG. 1 during an audio use mode.
Figure 8B:
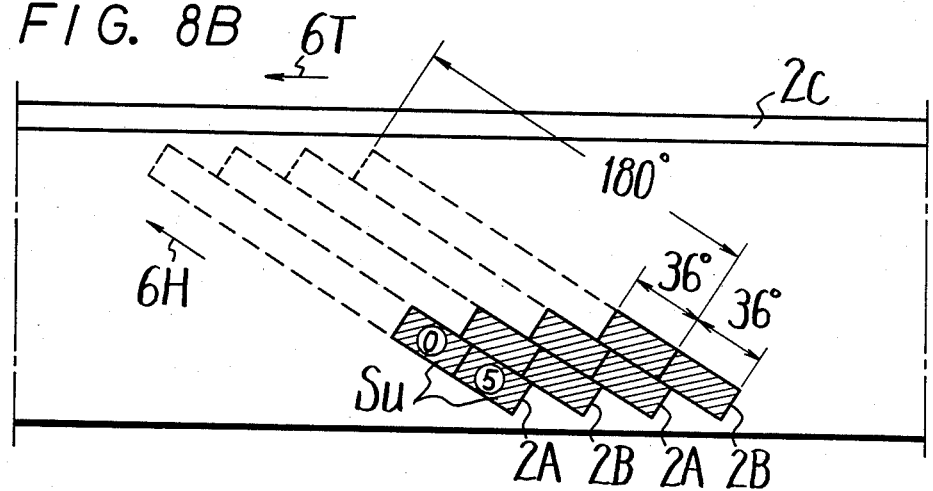
Figure 8C:
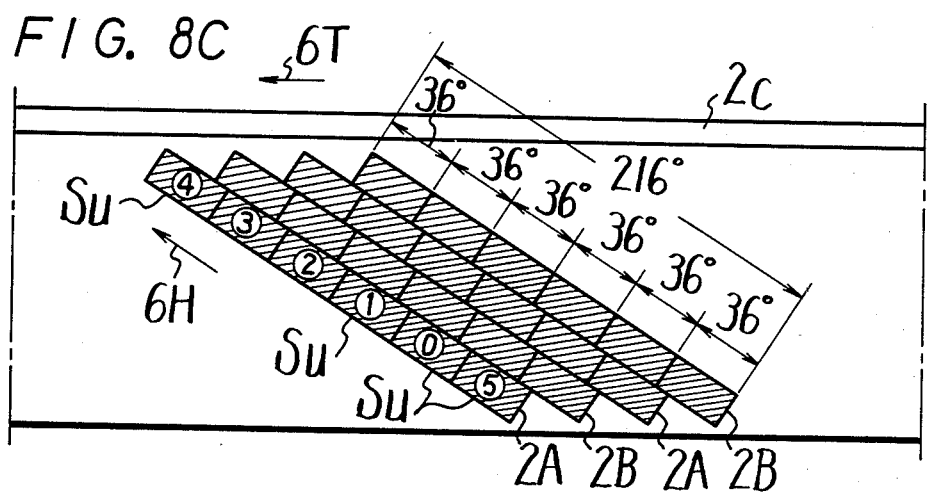

If it is desired to record the PCM audio signal $S_u$ in another segment ⓪, ①, ②, ③ or ④, the user merely actuates selecting circuit 34 so that the latter controls decoder 33 to change the phase of switch control signals $Q_a$ and $Q_b$, whereby PCM audio signal $S_u$ can be recorded in another segment of each of the tracks corresponding to a 36° rotation of magnetic heads 1A and 1B, as shown in FIG. 8C. For example, when selecting circuit 34 designates the count value $N_{32}$ of "0" and "5", decoder 33 produces switch control signals $Q_a$ and $Q_b$ as shown in FIG. 3D$_2$ so that change-over switches 17A and 17B supply PCM audio signal $S_u$ from recording amplifier 24 to magnetic heads 1A and 1B, respectively, only during time periods $T_0$ of each field interval $T_a$ and $T_b$. Further, at such time, control signal $Q_p$, which is produced in response to switch control signals $Q_a$ and $Q_b$, enables PCM processing circuit 22 to produce PCM audio signal $S_p$ only during the aforementioned time periods $T_0$ of each field interval $T_a$ and $T_b$. In this manner, PCM audio signal $S_u$ is recorded in each segment ⓪ of each track, as shown in 8B, while no signal is recorded in any other segment of each track. Thus, the user can select any desired segment of the tracks in which the PCM audio signal $S_u$ is to be recorded. FIGS. 3D$_3$ and 3D$_4$ show the timing of switch control signals $Q_a$ and $Q_b$ for recording the PCM audio signal $S_u$ in the 36° segment ① and last 36° segment ④, respectively, of each track.

It is to be appreciated that, with the present invention, as described above, the same audio signal processing circuitry, namely, PCM processing circuit 22 and FSK modulating circuit 23 can be used as that used during the video use mode. This is particularly important since PCM processing circuit 22 comprised of, for example, an analog-to-digital converter, a PCM encoder, and a compression circuit is relatively expensive and complicated in comparison with decoder 33 and selecting circuit 34 used for changing over the recording section of FIG. 1 between a video use mode and an audio use mode. It is to be appreciated that the PCM audio signal reproduces as a high quality analog audio signal with a good tone quality, good frequency characteristics, high signal-to-noise (S/N) ratio, and the like. In addition, since PCM audio signal $S_u$ is recorded in the entire portion of each track, that is, in segment ⑤ corresponding to the overscan section of each track and in segments ⓪ to ④ corresponding to the main section of each track, as shown in FIG. 3I, with each segment containing information corresponding in time to one field interval of a video signal, each track contains audio information corresponding to six field intervals. In this manner, the recordable time of the PCM audio signal during the audio use mode becomes six times as long as the recordable time of the information signal in the video use mode. It is also to be noted that the sequential order in which PCM audio signal $S_u$ is recorded in each of the segments can be freely varied by selecting circuit 34. As a result, because of recording in the different segments, it becomes relatively easy to access different audio selections recorded in the tracks, without performing a lengthy search operation for a desired selection. Further, the PCM audio signal recorded in each segment is of the same form, thereby enhancing the simplicity of the recording arrangement.

Figure 2:
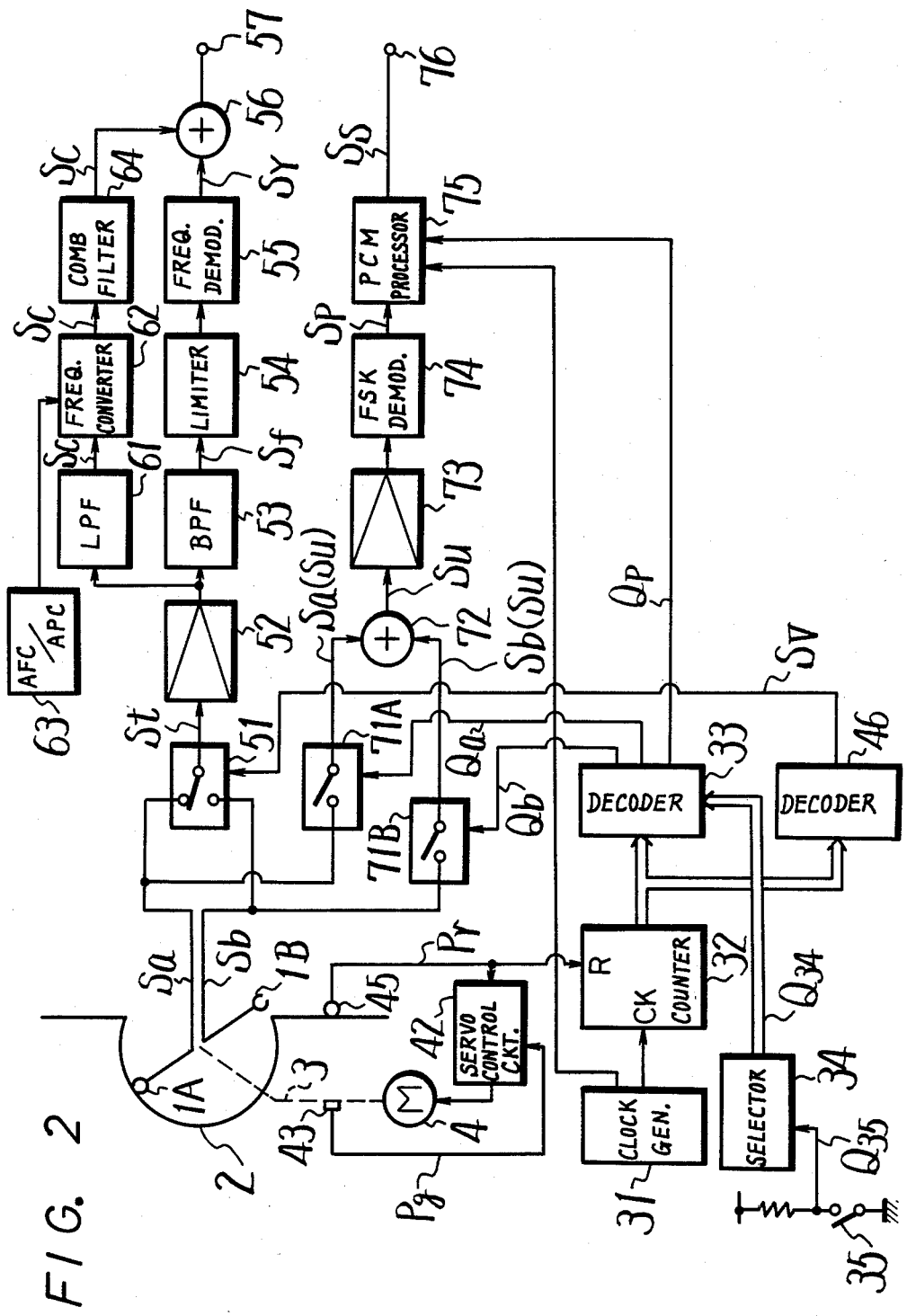
FIG. 2 is a block diagram of apparatus for reproducing an information signal according to one embodiment of the present invention.

Referring now to FIG. 2, a reproducing section of a helical scan video tape recorder according to one embodiment of the present invention will now be described, in which elements corresponding to those previously described in regard to the recording section of FIG. 1 are identified by the same reference numerals and a detailed description thereof will be omitted herein for the sake of brevity. As shown therein, during the reproduction operation, magnetic head 45 reproduces control pulse signal $P_r$ from servo control track 2C, which is synchronized with the vertical synchronizing signal $P_v$ and supplies control pulse signal $P_r$ to servo control circuit 42. In the same manner as previously described in regard to the recording section of FIG. 1, servo control circuit 42 in response to control pulse signal $P_r$ and pulses $P_g$ generated by pulse generator 43 controls motor 4 to accurately maintain the correct rotary speed and phase relation for magnetic heads 1A and B.

Rotary magnetic head 1A is coupled to a first video contact of a change-over switch 51 and to an input contact of a switch 71A. In like manner, magnetic head 1B is connected to a second input contact of change-over switch 51 and to an input contact of a switch 71B. During the video use mode, change-over switch 51 is controlled to supply combined video signal $S_t$ recorded in the main section of each track corresponding to the last 180° rotation of each head with respect to the tracks as a continuous signal to a reproducing amplifier 52. Combined video signal $S_t$ from reproducing amplifier 52 is supplied to a band pass filter (BPF) 53 which separates the frequency-modulated luminance signal $S_f$ therefrom. A limiter circuit 54 limits the level of the frequency-modulated luminance signal $S_f$ from BPF 53 and a frequency demodulation circuit 55 demodulates the output signal from limiter circuit 54 to produce the original luminance component $S_y$, as shown in FIG. 3A, which is supplied to one input of an adder 56. Combined video signal $S_t$ is also supplied to a low pass filter (LPF) 61 which separates the frequency-converted chrominance signal $S_c$ therefrom. A frequency converter 62 frequency re-converts the frequency-converted chrominance signal $S_c$ to its original frequency band and corrects any time base error, thereby producing the original chrominance component $S_c$. An automatic frequency control (AFC) and automatic phase control (APC) circuit 63 may also be provided with respect to frequency converter 62 to control the frequency and phase of the chrominance component $S_c$. The chrominance component $S_c$ from frequency converter 62 is supplied through a C-type comb filter 64, whereby, to eliminate cross-talk interference between adjacent tracks, and then to another input of adder 56 where it is added to the luminance component $S_y$ to produce the original color video signal at an output terminal 57.

The PCM audio signal $S_u$ reproduced from magnetic heads 1A and 1B is supplied through switch circuits 71A and 71B, respectively, to an adder 72 which combines the PCM audio signal $S_u$ reproduced by each head to produce a combined PCM audio signal $S_u$. This latter signal is supplied from adder 72 through a reproducing amplifier 73 to an FSK demodulation circuit 74 which is complementary to FSK moduluation circuit 23 of FIG. 1 and which produces the compressed PCM audio signal $S_p$. A PCM processing circuit 75 processes the compressed PCM audio signal $S_p$ from FSK demodulation circuit 74 in a complementary manner to the characteristic imparted by PCM processing circuit 22 in the recording section of FIG. 1, to thereby produce the original analog audio signal $S_s$ at the output thereof. In particular, PCM processing circuit 75 expands the time base of the compressed PCM audio signal $S_p$ supplied thereto. PCM processing circuit 75 also includes a PCM decoding circuit which provides a characteristic complementary to the PCM encoding circuit of PCM processing circuit 22 and a digital-to-analog (D/A) converting circuit which returns the digitized audio signal to analog form to thereby produce the analog audio signal $S_s$ at an output thereof. In addition, PCM processing circuit 75 includes an error correcting decoder which decodes the PCM audio signal in accordance with the error correcting codes added by PCM encoding circuit 22. PCM processing circuit 75 is also supplied with clock pulses from clock generator 31. The analog audio signal S from PCM processing circuit 75 is then supplied to an audio signal output terminal 76.

The reproducing section of FIG. 2 also utilizes control circuit 30 of FIG. 1 to produce the aforementioned control signals $Q_a$, $Q_b$ and $Q_p$. During the video use mode, selection signal $Q_{35}$ is at a high or logic "1" level, whereby selecting circuit 34 designates count values $N_{32}$ of "9" and "4" so that decoder 33 produces switch control signals $Q_a$ and $Q_b$ with the phase relation shown in FIG. $3D_1$. In this manner, switch control signals $Q_a$ and $Q_b$ control switches 71A and 71B to supply PCM audio signal $S_u$ reproduced by heads 1A and 1B during scanning by the latter of the overscan section of each track, to adder 72, with the relation shown in FIG. 3H. In addition, the count value $N_{32}$ from counter 32 is supplied to a decoder 46 which produces a signal $S_v$ in synchronism with the vertical synchronizing signal and which is inverted during alternate field intervals $T_a$ and $T_b$. Signal $S_v$ from decoder 46 is supplied to changeover switch 51 so that the latter alternately supplies the video signal reproduced by magnetic heads 1A and 1B as a continuous combined video signal $S_t$ to reproducing amplifier 52.

During reproduction in the audio use mode, in which the PCM audio signal $S_u$ is recorded, for example, in the form shown in FIG. 8C, selection signal $Q_{35}$ from switch 35 is at a logic "0" level. Accordingly, PCM audio signal $S_u$ recorded in segments ⑤ and ⓪ to ④ as shown in FIGS. 3I and 8C, are reproduced by magnetic heads 1A and 1B. The user, at such time, designates the count value $N_{32}$ by controlling selecting circuit 34 so that only the PCM audio signal $S_u$ reproduced during a single time period in each field interval $T_a$ and $T_b$ is reproduced. For example, if it is desired to reproduce the PCM audio signal only during time period $T_0$ in each field interval $T_a$ and $T_b$, that is, corresponding to segment ⓪ in each track, selecting circuit 34 is switched to designate count values $N_{32}$ of "0" and "5", in much the same manner as previously described with respect to the recording section of FIG. 1. As a result, decoder 33 produces switch control signals $Q_a$ and $Q_b$ with the phase relation shown in FIG. $3D_2$ and also produces control signal $Q_p$ as an OR product of switch control signals $Q_a$ and $Q_b$ which is supplied to PCM processing circuit 75 to enable the latter to process the PCM audio signal $S_p$ supplied thereto only during time period $T_0$ of each field interval.

It is to be appreciated that various modifications can be readily by one skilled in the art. For example, if the frequency of the clock pulses from clock generator 31 are, for example, 180 times as high as the field frequency, segments 5 and 0 to 4 can be formed when the count value $N_{32}$ is "324 to 358", "0" to "34", "36" to "70", "72" to "106", "108" to "142", and "144" to "178", so that guard bands can be provided between the different segments as protective intervals against vibration from contact between the tape and heads, drop-out and the like.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. Apparatus for recording an information signal comprising at least an audio signal in a plurality of successive tracks on a record medium, comprising:
    audio signal processing means for converting said audio signal into digital form;
    video signal processing means for processing a video signal of said information signal to produce an output video signal;
    transducer means for recording said output video signal and said digitized audio signal in said plurality of successive tracks on said record medium;
    switch means for supplying said output video signal and said digitized audio signal to said transducer means; and
    control means for controlling said switch means to supply said output video signal and said digitized audio signal to said transducer means during a video use mode so that said transducer means records the output video signal in a main section of each track and the digitized audio signal in an overscan section of each track and to supply only said digitized audio signal to said transducer means during an audio use mode so the said transducer means records the digitized audio signal in at least one of the main section and overscan section of each track.

2. Apparatus according to claim 1; in which said control means includes counter means for counting a predetermined number of time periods for each field interval of said video signal and producing a count value in response thereto; selector means for selecting at least one desired one of said count value and producing an output signal corresponding thereto; and decoder means for producing at least one switch control signal in response to said count value and said output signal from said selector means and supplying said at least one switch control signal to said switch means to control the latter to supply said output video signal and said digitized audio signal to said transducer means during said video use mode so that said transducer means records the output video signal in the main section of each track and the digitized audio signal in the overscan section of each track and to supply only the digitized audio signal to said transducer means during said audio use mode so that said transducer means records the digitized audio signal in at least one of the main section and overscan section of each track.

3. Apparatus according to claim 2; in which said control means includes means for producing a vertical synchronizing signal having a period equal to a field interval of said video signal; and clock generator means for producing clock pulses; and said counter means produces said count value in response to said clock pulses and said vertical synchronizing signal.

4. Apparatus according to claim 3; in which said control means includes frequency divider means for producing a frequency-divider signal in response to said vertical synchronizing signal and having a period equal to twice that of said vertical synchronizing signal; and said counter means includes a reset input terminal supplied with said frequency-divided signal and a clock input terminal supplied with said clock pulses.

5. Apparatus according to claim 4; in which said video signal includes a vertical synchronizing signal and said clock generator means produces a substitute vertical synchronizing signal having a period substantially equal to that of said vertical synchronizing signal of said video signal; and said control means includes switch means for supplying one of said vertical synchronizing signal of said video signal and said substitute vertical synchronizing signal to said frequency divider means, and switch control means for controlling said switch means to switch said vertical synchronizing signal of said video signal to said frequency divider means during said video use mode and to switch said substitute vertical synchronizing signal to said frequency divider means during said audio use mode.

6. Apparatus according to claim 2; in which said selector means includes switch control means for producing a selection signal corresponding to one of said video use mode and said audio use mode, and count value selector means for producing said output signal in response to said selection signal.

7. Apparatus according to claim 6; in which said count value selector means selects a predetermined count value corresponding to a time period when said transducer means records said digitized audio signal in the overscan section of each track during said video use mode, and said selector means can be varied to select a count value corresponding to a time period when said transducer means records said digitized audio signal in at least one of the overscan section and main section of each track during said audio use mode.

8. Apparatus according to claim 7; in which said decoder means produces two switch control signals and a control signal corresponding to a combination of said switch control signals and supplies said control signal to said audio signal processing means to enable the latter to process said digitized audio signal only during time periods corresponding to said count value selected by said selector means.

9. Apparatus for reproducing an information signal comprising at least a digitized audio signal recorded in a plurality of successive tracks on a record medium, with the digitized audio signal being recorded in at least an overscan section of each track, said apparatus comprising:
transducer means for scanning the tracks to reproduce the information signal recorded in the plurality of successive tracks;
audio signal processing means for converting said digitized audio signal to an analog audio signal;
video signal processing means for processing a video signal of said information signal to produce an output video signal;
switch means for supplying said information signal reproduced during scanning of the overscan section of each track to said audio signal processing means and for supplying said information signal reproduced during scanning of a main section of each track to one of said audio signal processing means and said video signal processing means; and
control means for controlling said switch means to supply said information signal reproduced during scanning of the main section of each track to said audio signal processing means during an audio use mode and to supply said information signal reproduced during scanning of the main section of each track to said video signal processing means during a video use mode.

10. Apparatus according to claim 9; in which said control means includes counter means for counting a predetermined number of time periods for each field interval of said video signal and producing a count value in response thereto; selector means for selecting at least one count value and producing an output signal corresponding thereto; and decoder means for producing at least one switch control signal in response to said one count value and said output signal from said selector means and supplying said at least one switch control signal to said switch means to control the latter to supply said information signal reproduced during scanning of the main section of each track to said video signal processing means during said video use mode and to supply said information signal reproduced during scanning of the main section of each track to said audio signal processing means during said audio use mode.

11. Apparatus according to claim 10; in which said control means includes means for reproducing a control pulse signal, and clock generator means for producing clock pulses; and said counter means produces said count value in response to said clock pulses and said control pulse signal.

12. Apparatus according to claim 10; in which said selector means includes switch control means for producing a selection signal corresponding to one of said video use mode and said audio use mode, and count value selector means for producing said output signal in response to said selection signal.

13. Apparatus according to claim 12; in which said count value selector means selects a predetermined count value corresponding to a time period when said transducer means reproduces said digitized audio signal from the overscan section of each track during said video use mode, and said selector means can be varied to select a count value corresponding to a time period when said transducer means reproduces said digitized audio signal from at least one of the overscan section and main section of each track during said audio use mode.

14. Apparatus according to claim 13; in which said decoder means produces two switch control signals and a control signal corresponding to a combination of said switch control signals and supplies said control signal to said audio signal processing means to enable the latter to process said digitized audio signal only during time periods corresponding to said count value selected by said selector means.

15. Apparatus for recording on a record medium a first audio signal representing a first audio selection and at least one additional audio signal representing at least one additional audio selection; said apparatus comprising:
- audio signal processing means for converting said first audio signal into a first set of discrete, time-compressed digital signals and said additional audio signal into an additional set of discrete, time-compressed digital signals;
- transducer means responsive to said digital signals;
- transport means for establishing a relative scan of said transducer means with respect to said record medium in a multiplicity of successive parallel tracks;
- switch means selectively connecting said audio signal processing means to said transducer means; and
- control means for controlling said switch means to supply said digital signals to said transducer means in a manner such that said transducer means records respective signals of said first set of digital signals on said record medium while traversing respective segments of a first set of discrete segments of said tracks and records respective signals of said additional set of digital signals on said record medium while traversing respective segments of an additional set of discrete segments of said tracks;
- the segments of said first set of segments being arranged in a first row and being respectively located in successive ones of said tracks; and
- the segments of said additional set of segments being arranged in an additional row and being respectively located in successive ones of said tracks;
- whereby each of said tracks contains a segment of said first set of segments and a segment of said additional set of segments.

16. Apparatus according to claim 15; wherein the number of said additional audio signals, of said additional audio selections, of said additional sets of digital signals, and of said additional sets of segments is within the range of two to five.

17. Apparatus according to claim 15; wherein said digital signals are all of equal time length and said segments are all of equal area.

18. Apparatus for reproducing a first audio signal and at least one additional audio signal recorded in a multiplicity of parallel tracks on a record medium and respectively including a first set of discrete, time-compressed digital signals representing a first audio selection and at least one additional set of discrete, time-compressed digital signals representing at least one additional audio selection, respective signals of said first set of digital signals being recorded in respective segments of a first set of discrete segments of said tracks, respective signals of said additional set of digital signals being recorded in respective segments of an additional set of discrete segments of said tracks, the segments of said first set of segments being arranged in a first row and being respectively located in successive ones of said tracks, and the segments of said additional set of segments being arranged in an additional row and being respectively located in successive ones of said tracks, whereby each of said tracks contains a segment of said first set of segments and a segment of said second set of segments; said apparatus comprising:
- transducer means responsive to said recorded digital signals for generating a transducer output signal;
- transport means for establishing a relative movement of said transducer means with respect to said record medium, whereby said transducer means sequentially scans said tracks;
- audio signal processing means responsive to said transducer output signal for converting said digital signals to analog time-decompressed form;
- switch means selectively connecting said audio signal processing means to said transducer means; and
- control means for controlling said switch means selectively to supply to said audio signal processing means only the signals of said first set of digital signals for reproducing said first audio selection or only the signals of said additional set of digital signals for reproducing said additional audio selection.

* * * * *